Feb. 7, 1961

H. J. DOLL 2,970,852

HITCH PIN

Filed Sept. 15, 1959

Harvey J. Doll
INVENTOR.

BY *Clarence A. O'Brien*
and *Harvey B. Jacobson*
Attorneys

United States Patent Office 2,970,852
Patented Feb. 7, 1961

2,970,852
HITCH PIN
Harvey J. Doll, R.F.D. 1, Bushnell, Ill.
Filed Sept. 15, 1959, Ser. No. 840,057
5 Claims. (Cl. 280—515)

This invention relates to hitches and more particularly to a hitch pin for use in connecting the tongue of a wagon or other drawn vehicle to the drawbar of a tractor or other draft vehicle.

An object of the invention is to provide a hitch pin capable of being withdrawn or inserted by use of an attached handle, by a tractor operator while seated on the tractor.

Another object of the invention is to provide a hitch pin capable of being operated from the seat of a tractor and which is equipped with a handle by which the tongue may be elevated by the tractor operator when attaching the tongue by means of the hitch pin, to the tractor drawbar. Further, the handle is so constructed that it is used for locking and unlocking the pin in one of two selected positions i.e. the locked position or the released position.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1:
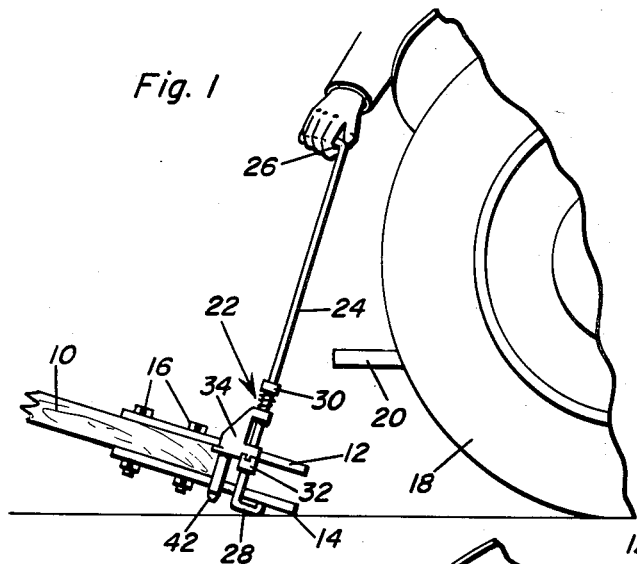
Figure 1 is a side elevational view of a part of a tongue and a portion of a tractor containing a tractor drawbar together with a hitch pin showing the tractor operator preparing to lift the tongue by the handle of the hitch pin.

In the accompanying drawing there is a conventional wagon or other type of tongue 10 provided with a pair of spaced plates 12 and 14 which are connected by bolts 16 to the tongue and which form a longitudinal extension thereof. Tractor 18 is conventional and has a conventional drawbar 20 within which there is at least one hole for pin insertion.

The hitch pin assembly 22 is made of a handle 24 having a hand grip 26 at the upper end and a hook 28 at the lower end. An upper fixed collar 30 is secured to handle 24, and there is a lower fixed collar 32 also secured to handle 24 but spaced from collar 30. Collars 30 and 32 are spaced from each other to allow for bracket 34 located therebetween and having a pair of spaced sleeve bearings 36 and 38 through the bores of which handle 24 extends.

Spring 40 is seated on bearing 36 and also seated on collar 30. The spring 40 provides a yielding bias against the movement of handle 24 in an upward direction and provides the tension required to keep the lug 46 locked into the notches 48 or 50 on collar 32, either in an open or closed position.

The pin 42 is secured to bracket 34 and extends downwardly from the bottom of this bracket. Pin 42 is held fixed to bracket 34 by being welded or otherwise secured thereto.

Figure 6:
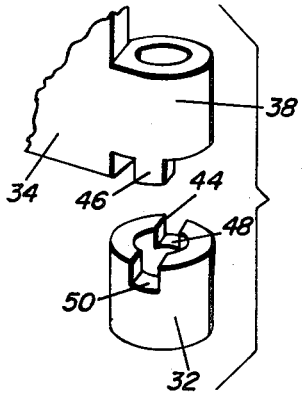
Figure 6 is a fragmentary perspective view showing a locking device constituting part of the hitch pin.

Locking device or lock 44 is operatively connected between collar 32 and bearing 38. As shown in Figure 6 the locking device 44 consists of lug 46 on bearing 38 at the lower part thereof, and a pair of upwardly opening ntoches 48 and 50, 180° removed from each other and formed on collar 32. Lug 46 is adapted to seat in notch 48 or notch 50 depending on the desires of the operator, and the notches and lug establish the closed or opened position for the hitch pin assembly.

In use and operation, the handle 24 is turned in an opened position with the pin 42 on the opposite side from the hook 28 (Figure 1).

Assuming that the tractor operator wishes to lift tongue 10, he merely extends hook 28 below and under tongue plate 14 raising it and plate 12 to an aligning position with tractor drawbar 20. Still seated in a driving position the operator now backs his tractor until the drawbar hole is aligned with the holes in tongue plates 12 and 14.

Figure 3:
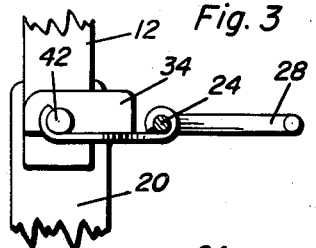
Figure 3 is a top view of the hitch pin in an inserted, but unlatched position.
Figure 4:
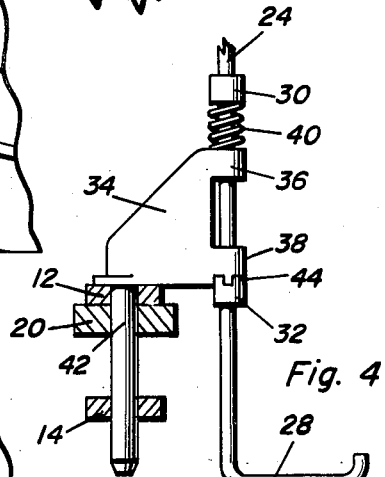
Figure 4 is a sectional view showing the hitch pin in an inserted but unlatched position.

With the bottom of tongue plate 12 now resting on the top of the tractor drawbar 20 the hook 28 is lowered and disengaged from the tongue plate 14. The operator now raises the device (still in an opened position) and inserts the pin 42 into the holes through plate 12, drawbar 20 and plate 14 (Figures 3 and 4).

Figure 2:
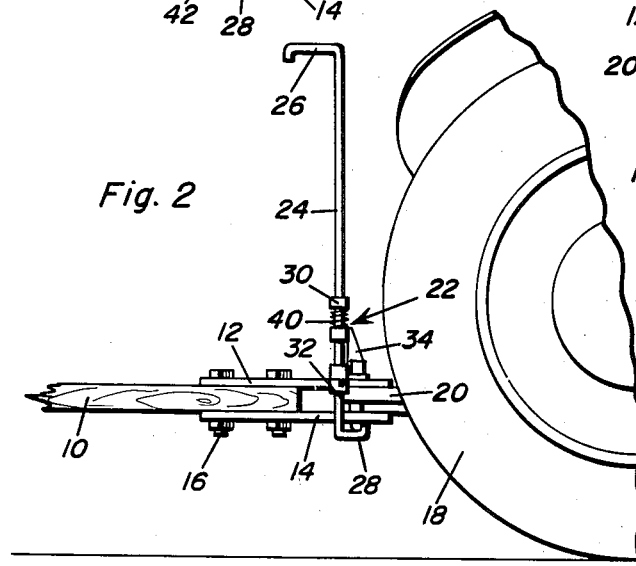
Figure 2 is a side elevational view similar to Figure 1 but showing the hitch pin in a latched position.
Figure 5:
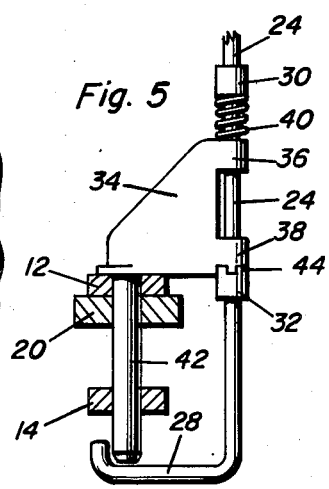
Figure 5 is a sectional view showing the hitch pin in an inserted and latched position.

The device is then closed and locked by exerting downward pressure on handle 26 to release lock 44 and turning handle 180° to the second locking position (Figures 2 and 5), thereby firmly coupling it so it cannot inadvertently be released.

When tractor drawbar is not coupled to a wagon or other vehicle the hitch pin can be carried in a locked position in the tractor drawbar within easy reach of the operator.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A hitch pin assembly for a conventional drawbar and a conventional tongue comprising a handle provided with a hook on one end thereof, a bracket rotatably journaled on said handle, a pin secured to said bracket extending parallel to said handle but spaced therefrom, and means for selectively locking said handle and bracket in a first rotatable position with said hook extending immediately adjacent said pin, and in a second rotatable position with said hook extending away from said pin.

2. The combination of claim 1 wherein said means includes a bracket bearing slidably and rotatably received on said handle, a lug projecting from said bracket bearing, and fixed notch means on said handle adapted to receive said lug for locking said bracket to said handle in either said first or second rotatable positions.

3. The combination of claim 2 wherein spring means carried by said handle engage said bracket urging said bracket bearing lug into said fixed notch means.

4. The combination of claim 3 wherein said fixed notch means comprise a sleeve secured to said handle defining a pair of diametrically opposed axial notches thereon.

5. The combination of claim 4 wherein said handle has a grip at one end thereof remote from said hook.

References Cited in the file of this patent
UNITED STATES PATENTS 2,535,468    Von Bank _____ Dec. 26, 1950
2,548,259    Hall _____ Apr. 10, 1951
2,757,021    Moon _____ July 31, 1956